United States Patent
Andrick

(10) Patent No.: US 6,719,302 B2
(45) Date of Patent: Apr. 13, 2004

(54) SYMMETRICAL GASKET FOR A PIPE JOINT WITH INCREASED SURFACE CONTACT

(75) Inventor: William C. Andrick, Uniontown, OH (US)

(73) Assignee: Vertex, Inc., Mogadore, OH (US)

( * ) Notice: Subject to any disclaimer, the term of this patent is extended or adjusted under 35 U.S.C. 154(b) by 144 days.

(21) Appl. No.: 09/897,854

(22) Filed: Jul. 2, 2001

(65) Prior Publication Data

US 2003/0001343 A1 Jan. 2, 2003

(51) Int. Cl.[7] .............................................. F16L 21/025
(52) U.S. Cl. ...................... 277/604; 277/602; 277/605; 277/608; 277/626
(58) Field of Search ................................ 277/602, 604, 277/605, 607, 615, 626, 627; 285/110, 231, 237, 345

(56) References Cited

U.S. PATENT DOCUMENTS

| | | | |
|---|---|---|---|
| 3,291,506 A | * 12/1966 | Blakeley | 285/112 |
| 3,647,229 A | 3/1972 | Grimes | 277/207 |
| 3,712,631 A | 1/1973 | Forchini et al. | 277/207 |
| 3,843,302 A | 10/1974 | Petzetakis | 425/388 |
| 4,304,415 A | 12/1981 | Wolf et al. | 277/205 |
| 4,313,828 A | 2/1982 | Brownlee | 210/198.2 |
| 4,350,350 A | * 9/1982 | Blakeley | 277/626 |
| 4,368,894 A | 1/1983 | Parmann | 277/166 |
| 4,508,355 A | 4/1985 | Ditcher | 277/189 |
| 4,529,211 A | 7/1985 | Rodgers | 277/63 |
| 5,687,976 A | 11/1997 | Andrick et al. | 277/207 A |
| 5,716,078 A | 2/1998 | Powers | 285/110 |

* cited by examiner

Primary Examiner—Anthony Knight
Assistant Examiner—Enoch E Peavey
(74) Attorney, Agent, or Firm—Fay, Sharpe, Fagan, Minnich & McKee, LLP

(57) ABSTRACT

A gasket for a pipe joint includes an annular gasket body which is symmetrical around an axial centerline and is therefore insensitive to axial orientation. The gasket is formed of a resilient material and includes a base adapted to sealingly engage an annular groove formed in one of the pipe segments to be joined. First and second protrusions run along the length of the gasket body and extend radially therefrom. The first and second projections are spaced apart symmetrically about the centerline. An annular bore, bisected by the center line, extends within the interior of the gasket body, and comprises a central region bridging first and second transversely spaced apart lobes. It is particularly suited for sealing an annular space in a bell-and-spigot pipe joint and provides an increased surface contact area to compensate for defects in the sealing surfaces of the pipes.

28 Claims, 7 Drawing Sheets

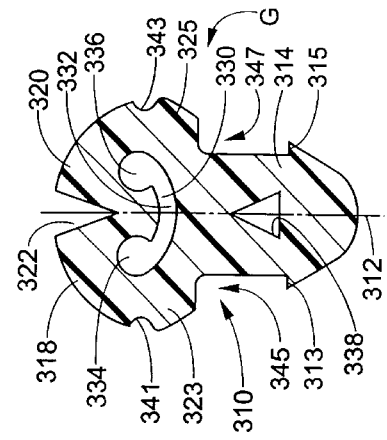
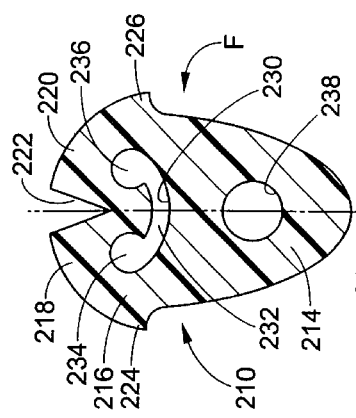
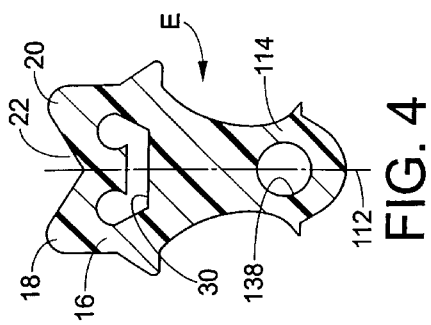
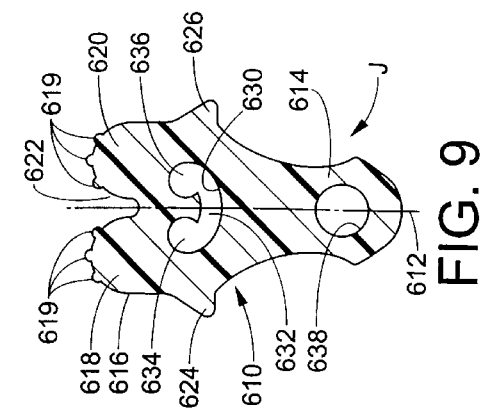
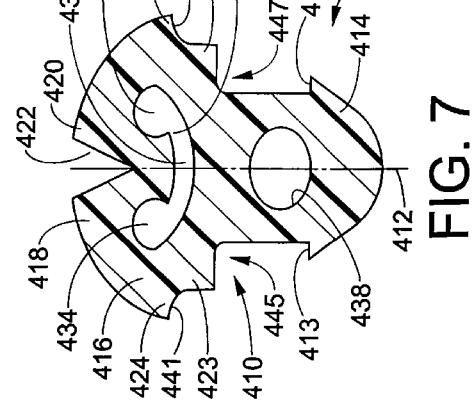

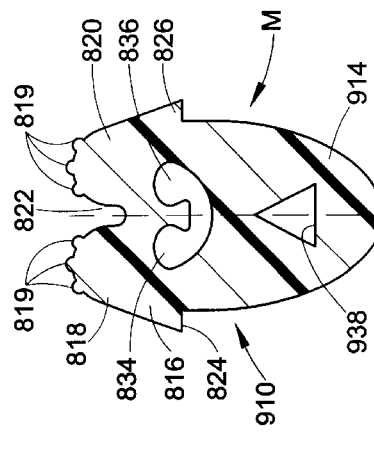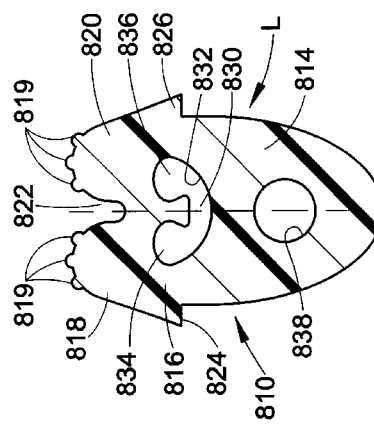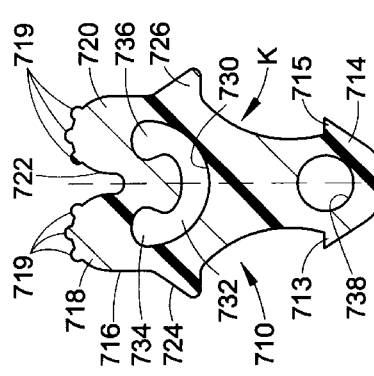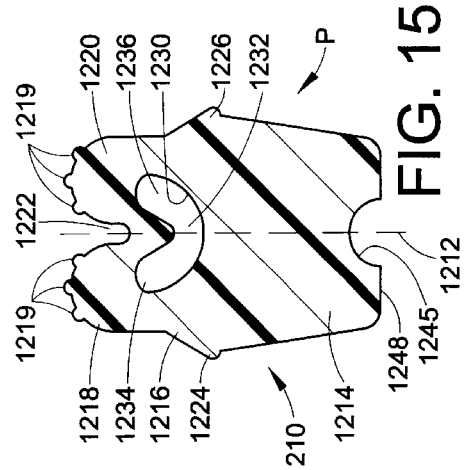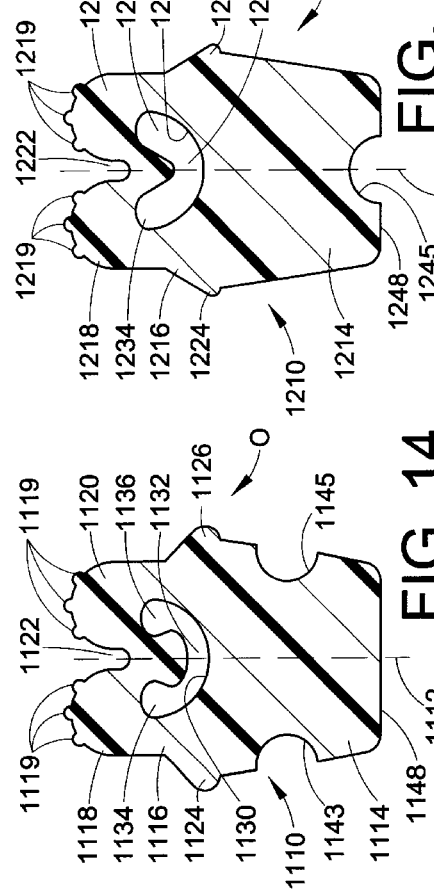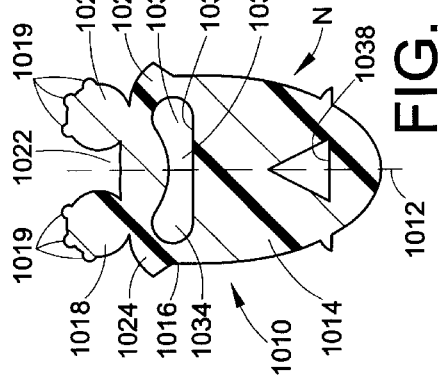

SYMMETRICAL GASKET FOR A PIPE JOINT WITH INCREASED SURFACE CONTACT

BACKGROUND OF THE INVENTION

The present invention relates generally to flexible fluid-type seals for pipe joints. More particularly, the invention relates to a gasket adapted for sealing bell-and-spigot type pipe joints.

The gasket disclosed herein is particularly adapted for use in the field of sewer pipe assemblies. However, it should be appreciated that the gasket design disclosed could be adapted for use in many other types of pipe joints as well.

Sewer pipe assemblies are generally made of plastic, polyethylene, metal, concrete, or other suitable materials. These are fabricated in many configurations and sizes to meet specific requirements and users' preferences. In many such pipe assemblies, grooves are formed or recesses are provided in ribbed or corrugated types of pipe. Although a spigot, i.e., a male groove, is the dominant method employed for manufacturing sewer pipes, it is also possible that a formed groove in the bell, i.e., female pipe, can be utilized.

Some gaskets are integrally installed at the factory during fabrication of the sewer pipes while others are simply applied at the job site. For very large diameter concrete pipes, such as in storm and sanitary sewer systems, field installation of the gaskets is generally considered necessary.

Historically, piping systems have utilized polymeric gasket elements to provide resilient seals under various operating conditions. These include no internal pressure, no external pressure, working internal pressure, high external pressure, internal vacuum, or any combination of these. In each case, the gasket must maintain its ability to seal when quick changes occur in the pressures imposed on the gasket.

O-ring type gaskets have frequently been employed on large diameter pipe joints. The O-ring is typically mounted on the spigot, and the spigot is then pushed into the bell causing the O-ring to roll further onto the spigot until it reaches roughly the center of the pipe connection. Dirty or uneven surfaces, poor or improperly applied lubricants, misaligned pipes, and excessive force may cause the O-ring to distort non-uniformly, resulting in a weak seal, or even in a void through which fluids can flow. Some spigots include a circumferential groove or a single or a double offset shoulder to keep the O-ring from rolling as the pipes are interconnected. However, the diameter of the O-ring and its radial cross-section are usually greater than the depth of the groove or shoulder and the ring may still roll over the inside edge of the groove, become snagged or shear off segments of the O-ring as the spigot enters the bell.

Various gasket configurations have been used or suggested for overcoming these deficiencies. In order to provide self-alignment of the gasket, various gasket profiles have been developed. Typically, however, it is essential that the gasket be placed on the spigot in a desired orientation. That is, the gasket functions properly only when it is installed in a particular direction and cannot function if installed in a reverse or backwards manner. This has made it necessary for identification marks to be placed on the surface of the gasket for the purpose of distinguishing the front, or functional side, of the gasket profile from the back, or non-functional side. These stripes, printing, or color coding identifiers then become critical to the success or failure of the sealing system.

Sealing rings are known for sealing against fluid flow in both high and low pressure conditions in either direction. However, these sealing rings are not symmetrical and, therefore, can be installed incorrectly so that they will not seal properly.

There are symmetrical gaskets known for pipe joints. In commonly assigned U.S. Pat. No. 5,687,976, the entire contents of which are incorporated herein by reference, there is disclosed a symmetrical pipe joint gasket which includes an annular gasket body formed of a resilient material. The gasket includes a projection which extends radially away from the gasket body and an annular bore which is spaced away from the projection and which extends in the gasket body. Both the projection and the annular bore are located so that they are bisected by the centerline of the gasket profile. The gasket is insensitive to axial orientation and is able to react to pressure fluctuations. It will be recognized that the gaskets in accordance with the present invention have many of the attendant advantages of those disclosed in U.S. Pat. No. 5,687,976.

Certain problems exist in pipe manufacturing processes that result in conditions which provide ineffective sealing surfaces on the portion of the pipe which contacts the gasket. Such surface conditions include, pitting, crazing, raised bumps, waviness, flow marks, indentations, undispersed ingredients that come to the surface, and other such conditions where the pipe surfaces are not as smooth and consistent as desired. Such defects have the ability to cause a weak seal or a failure in the pipe joint, especially under conditions of internal pressures, external pressures, and internal vacuums. The failures occur since a pathway for liquid or air is created over, under, or around these surface imperfections.

Typically, many pipe joints are disqualified because of these results. Although the pipe may be otherwise fully acceptable, a minor imperfection on the sealing surface where the gasket contacts the pipe may result in a failure. If the gasket chosen cannot overcome this type of operating challenge, increased costs to the pipe producer, contractor, and ultimately the property owner, result.

Since minor surface conditions will arise in some of the many, many miles of pipe produced each year, a gasket sealing system which can overcome such defects would be of assistance to manufacturers and users of such piping installations by providing additional confidence and reliability and preventing major problems in the field.

Accordingly, it has been considered desirable to develop a new and improved gasket and pipe joint design which would overcome the foregoing difficulties and others while providing increased seal efficiency under higher operating pressures and other benefits.

SUMMARY OF THE INVENTION

According to the present invention, a gasket and pipe joint employing the same is provided having increased surface contact area and force.

In accordance with a first aspect of the present invention, a pipe joint comprises an outer pipe and an inner pipe inserted therein, wherein an annular groove is formed on one of the facing surfaces of the outer and inner pipes. A gasket positioned within the annular groove is adapted to provide a seal between the inner and outer pipes. The gasket comprises an annular gasket body formed of a resilient material and is symmetric about a centerline. The gasket body includes a base adapted to sealingly engage the groove, and has first and second projections or protrusions which run longitudinally along the gasket body and extend away therefrom. The first and second projections are located on opposed sides of the centerline. An annular bore, extending interiorly within the gasket body, comprises a central region bridging first and second spaced apart lobes, the bore being located in the gasket body such that it is bisected by the centerline thereof.

In a second aspect, a non-directional gasket which is insensitive to axial gasket orientation includes an annular gasket body which is formed of a resilient material, and which has an axial centerline and a base adapted to sealingly engage an annular groove on a pipe. First and second protrusions are symmetrically spaced apart about the centerline, and an annular bore extends in the gasket body. The bore includes a central region bridging first and second spaced apart lobes and is bisected by the centerline.

In a third aspect, a gasket for sealing an annular space in a bell-and-spigot pipe joint is provided which can be installed in an associated pipe joint in either direction along a longitudinal axis of the associated pipe joint. The gasket includes an annular elastomeric web having an inner peripheral surface formed to sealingly engage an outer periphery of an associated spigot. The web is symmetric about a centerline, and first and second elastomeric protrusions are symmetrically contraposed thereabout. The protrusions project outward from the web and are deflectable to engage an inner periphery of an associated bell.

In a fourth aspect of the present invention, a pipe joint which can accommodate surface defects in a joined sealing surface includes an outer pipe and an inner pipe inserted into the outer pipe, wherein one of the pipes comprises an annular groove. A gasket positioned within the annular groove is adapted to provide a seal between the outer pipe and the inner pipe. The gasket includes an annular gasket body formed of a resilient material and is transversely symmetrical about a centerline. The gasket includes a base portion adapted to sealingly engage the groove. First and second projections run along the gasket body and extend away therefrom the first and second projections being symmetrically spaced apart about the centerline and defining a recess therebetween. The gasket body is deformable to increase a surface contact area when the inner pipe is inserted into the outer pipe. An annular bore extends in the gasket body. The bore is adapted to equalize pressure in transverse fashion across the surface contact area when the inner pipe is inserted into the outer pipe.

In a fifth aspect, an improved method is provided for producing an annular gasket of a type for sealing a gap between an inner pipe and an outer pipe, wherein one of the pipes carries a gasket within an annular groove. The gasket comprises a first end engaging the groove and a second end disposed opposite the first end facing an aligned sealing surface of the other of the inner and outer pipes. The method includes producing an elongate gasket, formed from an elastically compressible material, as by molding or extrusion, and attaching opposite ends of the gasket. At the same time that the elongate gasket is being produced, first and second projections are provided running along the gasket body and extending away therefrom, and the first and second projections being symmetrically spaced apart about an axial centerline of the gasket. Also produced at the same time the gasket body is being produced is an annular bore extending in the gasket body, the bore comprising a central region bridging first and second spaced apart lobes, the bore being located in the gasket body such that it is bisected by the centerline.

In a sixth aspect, a method for increasing the surface contact area of a gasket sealing a space between an inner pipe segment and an outer pipe segment adapted to receive the inner pipe comprises forming, at the same time the gasket is formed, first and second projections running along the gasket and extending radially therefrom. The first and second projections are symmetrically spaced apart about a centerline of the gasket. At the same time the gasket is formed, an annular bore is formed in the gasket. The bore comprises a central region bridging first and second spaced apart lobes, the bore being located within the gasket body such that it is bisected by the centerline. An annular groove is formed on one of the inner and outer pipes and the gasket is installed therein such that it is positioned within the annular groove. The inner pipe is then inserted into the outer pipe to compress the gasket and to provide a sealing pressure between the inner and outer pipes.

BRIEF DESCRIPTION OF THE DRAWINGS

The invention may take form in certain structures and parts, several preferred embodiments of which will be described in detail in this specification and illustrated in the accompanying drawings, wherein:

FIGS. 4–16 are cross-sectional views of some exemplary further embodiments of the present invention;

DETAILED DESCRIPTION OF THE PREFERRED EMBODIMENTS

Figure 1:
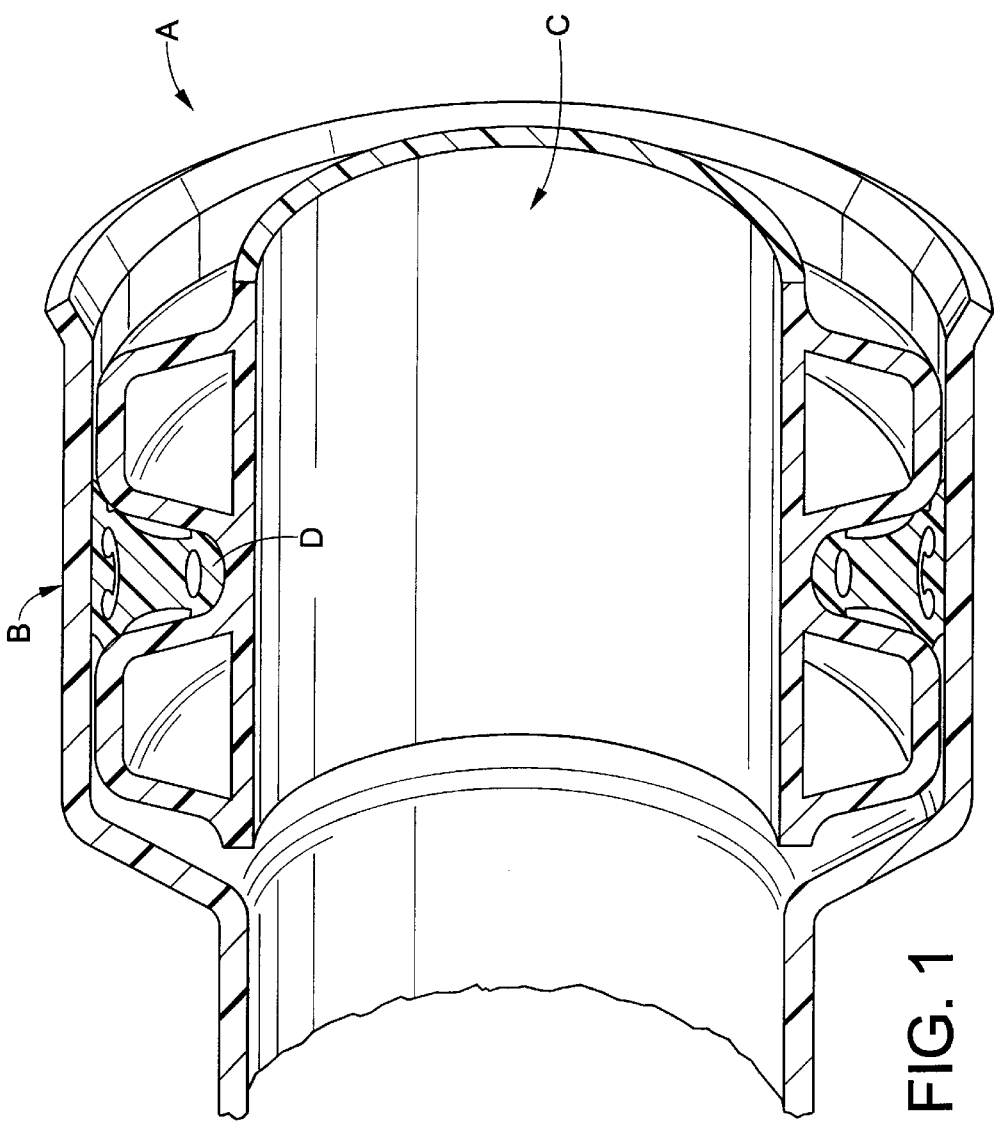
FIG. 1 is a perspective sectional view of a gasket and a pipe joint according to a first embodiment of the present invention.

Referring now to the drawings, wherein the showings are for purposes of illustrating several preferred embodiments of the invention only and not for purposes of limiting same, and further wherein like reference numerals and characters are used to denote like components throughout the several views, FIG. 1 shows a pipe joint A including a first, female pipe B (bell), a second, male pipe C (spigot), and a gasket D meant for sealing between the two pipes. Gasket D is shown in its compressed configuration. While the pipe joint is illustrated to be of the bell-and-spigot type which is generally used in sewer pipe assemblies, it should be appreciated by those of average skill in the art that the gasket illustrated herein could be used in other types of sealing environments as well.

Figure 2A:
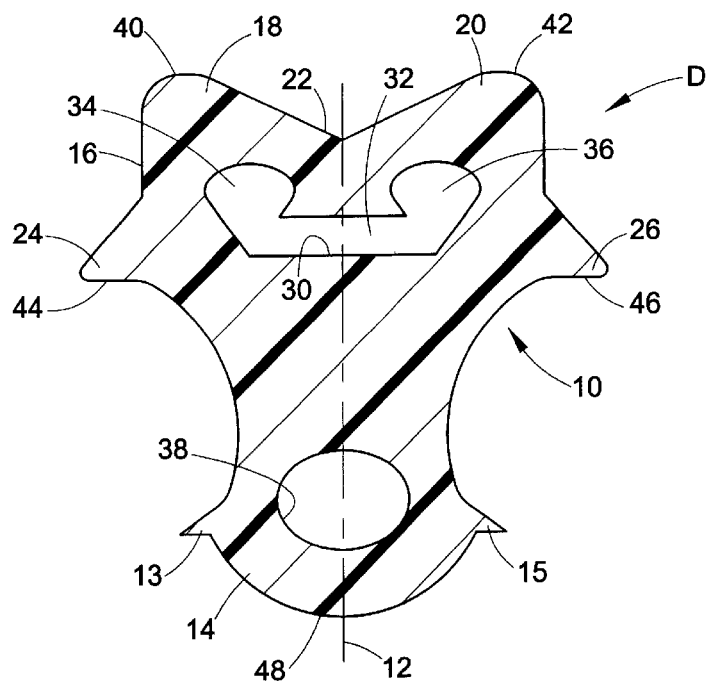
FIG. 2A is an enlarged cross-sectional view of the gasket of FIG. 1.

With reference now to FIG. 2A, the gasket D, shown in the uncompressed state, comprises an elongate annular gasket body or web 10. An axial centerline 12 bisects the gasket profile and axial extension of the centerline defines a plane of transverse symmetry of the gasket thereabout.

The gasket body includes a base portion 14 and an oppositely disposed upper (in the orientation shown) portion 16 having two protrusions 18 and 20 symmetrically disposed about centerline 12. The protrusions run longitudinally along the length of the gasket body 10 and extend outwardly, i.e., generally in the direction of the sealing force. A recess 22 is defined between the protrusions.

As used herein, the term "base portion" is intended to refer generally to the end of the gasket body which is intended to engage a complimentary depression in a pipe section (preferably in the male or spigot portion) forming a pipe joint, i.e., the proximal end of the annular gasket. The term "upper portion" is intended to refer to generally to the opposite end, which in operation is disposed toward an opposing surface of a pipe segment (preferably the female or bell portion) forming a pipe joint, i.e., the distal end of the annular gasket. The distinction, being made solely for ease of exposition, is general with there being no intention of defining a clear line of demarcation between the base and upper portions, such portions being integrally formed with each other.

The upper portion 16 also comprises transversely extending first and second wings or lips 24 and 26. The first and second lips are symmetrically located about the centerline 12.

Extending axially through the upper portion 16 is a channel or bore 30. The axial channel 30 comprises a central region 32 bridging first and second transversely spaced apart lobes 34 and 36. The axial channel 30 is symmetrical about the axial centerline 12. The lobes 34 and 36 extend toward the spaced apart protrusions 18 and 20, respectively, from within the gasket body 10.

Extending axially through the base 14 is an optional aperture 38, which is bisected by the axial centerline 12. In this embodiment, the aperture is illustrated to be elliptical in cross-sectional shape, although circular and other geometrical cross-sectional shapes are also contemplated.

The gasket body 10 is manufactured from a suitable conventional elastomeric material in a conventional manner, such as by extrusion, molding, and the like. The two ends of the gasket body are then secured together to form a toroidal shape as is well known in the art.

The material forming the gasket may be, for example, a synthetic or natural elastomeric or rubber material. Exemplary elastomeric materials which may be used in making the gasket include, but are not limited to, polyisoprene, neoprene, butadiene-acrylonitrile copolymers, ethylene-butadiene block copolymers, ethylene-propylene based copolymers, natural rubber, polychloroprene rubber, polyisoprene-isobutylene copolymers, silicone rubber, styrene-acrylonitrile copolymers, styrene-butadiene copolymers, styrene-maleic anhydride copolymers, and so forth.

A series of compression points are located on the gasket body 10. These comprise a first compression point 40 located at the apex of the first protrusion 18, a second compression point 42 located at the apex of the second protrusion 20, a third compression point 44 located at the lip 24, a fourth compression 46 point located at the lip 26, and a fifth compression point 48 located at the lowest point of the base 14. A pair of optional sealing lips 13 and 15 on opposite sides of base portion 14 provide additional contact points to effect sealing.

Figure 2B:
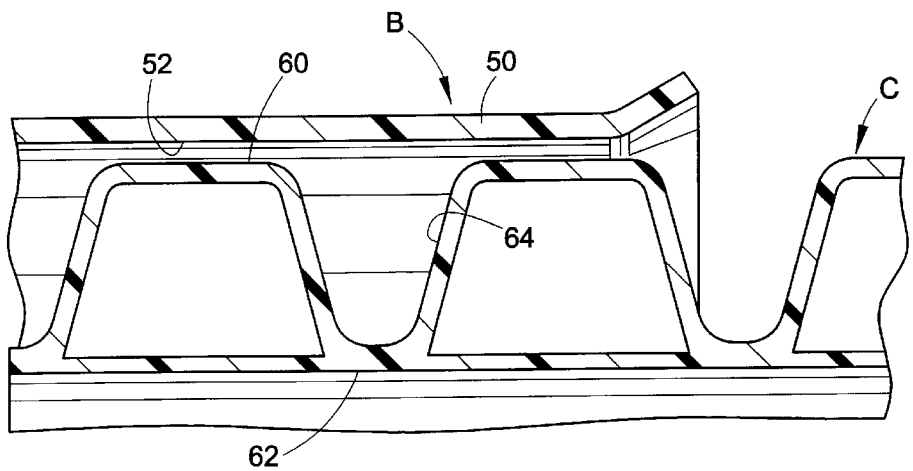
FIG. 2B is a cross-sectional view of the pipes in the pipe joint of FIG. 1.

With reference now to FIG. 2B, the gasket is meant to be used between the first pipe B and the second pipe C. The first pipe, or outer pipe, includes a bell 50 having an internal wall surface 52. The second pipe, or inner pipe, includes an external wall surface 60 and an internal wall surface 62 between which is defined a groove 64 which is generally U-shaped in cross-section.

Figure 3A:
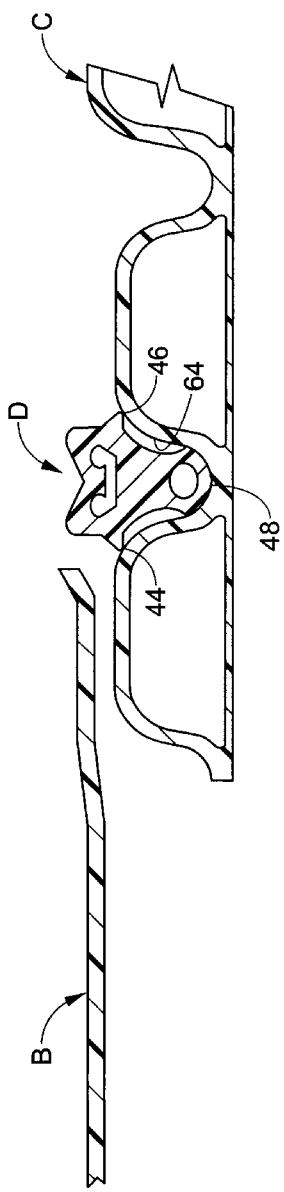
FIGS. 3A–3C illustrate the manner of assembling the pipe joint of FIG. 1.
Figure 3B:
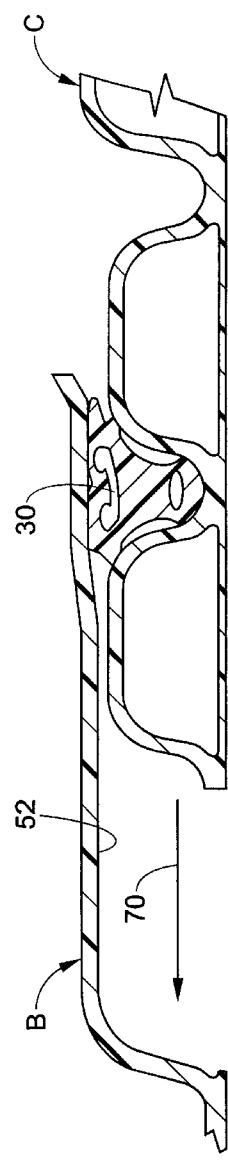
Figure 3C:
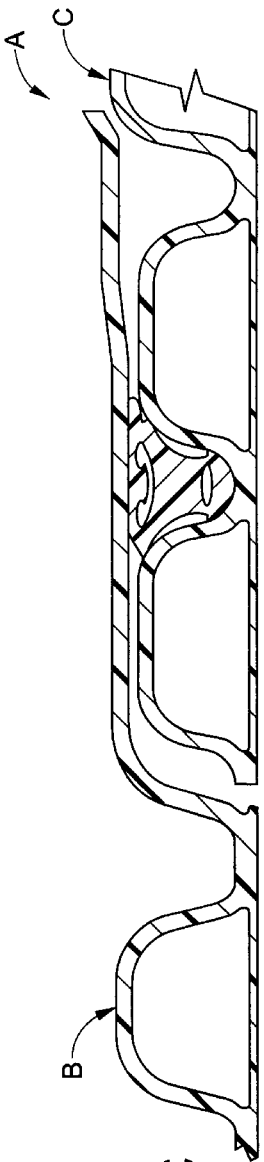

FIGS. 3A–3C illustrate a manner of assembling the pipe joint A in accordance with the present invention. The gasket D is placed in the groove 64 as illustrated in FIG. 3A. The groove 64 and the gasket D are sized such that once the gasket is so located, even in an uncompressed state, the third, fourth, and fifth compression points 44, 46, and 48 are in contact with the respective wall surfaces of the inner or second pipe C that define the U-shaped groove 64.

As illustrated in FIG. 3B, the second pipe C is inserted into the first pipe B in the direction 70 indicated. The sealing elements of the gasket are forced against the pipe surfaces during installation. The dual protrusions 18 and 20 compress or deform to create an increased surface contact area when they are displaced in cooperation with the bore 30 to conform to the annular space of the joint area.

As the second pipe C is inserted, the first protrusion 18 pushes against the inner surface 52 of the first pipe B, creating a mechanical force thereagainst. Upon further insertion, the second protrusion 20 also pushes against the inner surface 52 of the first pipe B.

The increased contact pressure or force provided by the gasket of the present invention is the result of a pressure transference from one side of the bore 30 to the other, forcing the gasket to move against the surfaces as the coupling or installation load increases. As the second pipe C is fully inserted into the first pipe B (FIG. 3C), the pressure substantially equalizes across the gasket and the increased force exerted in opposing directions is realized. This effect, then, allows the gasket to seal across a wider contact footprint than would typically be achieved with the prior art designs.

The increased surface contact area provided by the spaced apart deformable protrusions facilitates effective sealing in a piping system, even where surface defects or imperfections, may exist on the sealing surfaces of the pipe. Such defects include, for example, pitting, crazing, raised bumps, waviness, flow marks, indentations, undispersed ingredients that come to the surface, and the like. In this manner, a fully functional seal can be formed from pipe segments which would otherwise be disqualified due to such imperfections on the sealing surface of the pipe.

Hydraulic seal elements, such as lips 24 and 26 on the upper portion and lips 13 and 15 on the base portion, provide additional sealing benefits, including increased seal efficiencies under higher operating pressures. That is to say, the gasket contact pressure on the surfaces to be sealed increase as fluid pressures (internal or external) or internal vacuums are exerted on the gasket.

The incorporation of multiple hydraulic and compression areas on the gasket D allows for sealing capabilities in both a non-pressure environment or a low pressure environment, while the gasket is in compression, as well as in a pressurized condition, i.e., when the pressure on the gasket is hydraulically induced. Hydraulic and compression areas in the gasket are advantageously provided due to the increasing use of lower operating pressure sewer pipe lines. In such systems, the primary function of the gasket is low pressure sealing. However, when pressure fluctuations occur which put higher demands on the gasket, the gasket must be able to react in an acceptable and efficient manner and maintain a reliable seal under changing conditions.

The provision of dual protrusions on the gasket and the cooperating transversely extending bore in the gasket body provides an increased surface contact area to facilitate effective sealing in a piping system, even when the pipe joint sealing surfaces are not optimal. In this manner, the subject gasket can be used even when pipes have undesirable surface conditions or when the surfaces are otherwise not as smooth and consistent as desired to achieve a functional seal. Likewise, upon activation of the pipe line, the hydraulic sealing elements provide increased sealing efficiency when exposed to increasing sealing pressures. All of the foregoing is achieved in a gasket design which is not dependent on direction, since the gasket is symmetrical and the web is formed to fit in grooves in either axial direction.

With reference now to FIG. 4, a gasket design E according to a second embodiment of the present invention is illustrated. The gasket E, transversely symmetrical about a centerline 112, is similar to the gasket D and the description above by way of reference to FIG. 2A is equally applicable, with the exceptions that the gasket E has a somewhat narrower gasket body than gasket D, and base portion 114 comprises an annular bore 138 having a circular, rather than elliptical, cross-sectional shape.

In FIG. 5, a gasket P in accordance with a third embodiment of the present invention is illustrated. The gasket F comprises a gasket body 210 having an axial centerline 212 bisecting the gasket profile.

The gasket body includes a base portion 214 and an oppositely disposed upper portion 216 having two protrusions 218 and 220 which are symmetrically disposed about the centerline 212 and which run axially along the length of the gasket body 210. A recess 222 is defined between the two protrusions 218 and 220. The recess is illustrated as having a V-shaped cross section, although recesses having different cross-sectional shapes, such U-shaped or other linear or curvilinear shape, are also contemplated. The upper portion 216 also comprises a pair of transversely extending first and second lips 224 and 226 which are symmetrical and are located on opposing sides of the centerline 212.

Extending axially through the upper portion 216 is an aperture or bore 230. The aperture 230 comprises a central region 232 bridging first and second transversely spaced apart lobes 234 and 236. The axial channel 230 is symmetrical about the axial centerline 212. The lobes 234 and 236 extend toward the spaced apart protrusions 218 and 220, respectively. Extending axially through the base 214 is an optional aperture 238, which is bisected by the axial centerline 212. In this embodiment, the aperture is illustrated to be circular in cross-sectional shape, although elliptical and other geometrical cross-sectional shapes are also contemplated.

In FIG. 6, a gasket G in accordance with a fourth embodiment of the present invention is illustrated. Gasket G comprises a gasket body 310 having an axial centerline 312 bisecting the gasket profile.

The gasket body includes a base portion 314 and an oppositely disposed upper portion 316 having two protrusions 318 and 320 symmetrically disposed about the centerline 312. A recess 322 is defined therebetween. Extending axially through the upper portion 316 is an aperture or bore 330 comprising a central region 332 bridging first and second transversely spaced apart lobes 334 and 336. The channel 330 is symmetrical about the axial centerline 312. The lobes 334 and 336 extend toward the spaced apart protrusions 318 and 320, respectively.

The upper portion 316 also includes a pair of transversely extending first and second shoulders 323 and 325 symmetrically located about the centerline 312. The shoulders are defined by axially extending cutaway regions or recesses 345 and 347, respectively, in the base region 314, and axially extending recesses 341 and 343, respectively. The recesses 341 and 343 cooperate with other features of the gasket body 310 to provide a hydraulic sealing function to provide increased sealing pressure when hydraulic pressure is applied one or the other sides of the gasket G.

Extending axially through the base 314 is an optional aperture 338, which is bisected by the axial centerline 312. In this embodiment, the aperture 338 is illustrated as triangular in cross-sectional shape, although circular, elliptical and other geometrical cross-sectional shapes are also contemplated. The base 314 also includes optional sealing lips 313 and 315.

In FIG. 7, a gasket H in accordance with a fifth embodiment of the present invention is illustrated which comprises a gasket body 410 having an axial centerline 412 bisecting the gasket profile.

The gasket body includes a base portion 414 and an oppositely disposed upper portion 416 having two protrusions 418 and 420 symmetrically disposed about the centerline 412. A recess 422 is defined therebetween. Extending axially through the upper portion 416 is an aperture or bore 430 comprising a central region 432 bridging first and second transversely spaced apart lobes 434 and 436. The channel 430 is symmetrical about the axial centerline 412. The lobes 434 and 436 extend toward the spaced apart protrusions 418 and 420, respectively.

The upper portion 416 also includes first and second transversely extending lips 424 and 426 and first and second shoulders 423 and 425, each pair symmetrically disposed about the centerline 412. The lips 424 and 426 are defined by axially extending recesses 441 and 443, respectively. The shoulders 423 and 425 are defined by the recesses 441 and 443, respectively, as well as axially extending recesses 445 and 447, respectively, formed in the base region 414. The recesses 441 and 443 cooperate with other features of the gasket body 410 to provide a hydraulic sealing function to provide increased sealing pressure when hydraulic pressure is applied one or the other sides of the gasket H.

Extending axially through the base 414 is an optional aperture 438, which is bisected by the axial centerline 412. In this embodiment, the aperture 438 is illustrated as being generally elliptical in cross-sectional shape, although circular and other geometrical cross-sectional shapes are also contemplated. Optional sealing lips 413 and 415 are also provided on the base portion 414.

In FIG. 8, a gasket I in accordance with a sixth embodiment of the present invention is illustrated which comprises a gasket body 510 having an axial centerline 512 bisecting the gasket profile.

The gasket body includes a base portion 514 and an oppositely disposed upper portion 516 having two protrusions 518 and 520 symmetrically disposed about the centerline 512, defining a recess 522 therebetween. The protrusions 518 and 520 include a plurality of longitudinally running pressure ribs 519 disposed on the sealing surfaces thereof.

Extending axially through the upper portion 516 is an aperture or bore 530 comprising a central region 532 bridging first and second transversely spaced apart lobes 534 and 536. The channel 530 is symmetrical about the axial centerline 512. The lobes 534 and 536 extend toward the spaced apart protrusions 518 and 520, respectively.

The upper portion 516 also includes symmetric first and second transversely extending shoulders 524 and 526. The shoulder 524 forms a contiguous sealing surface with the protrusion 518 and the shoulder 526 forms a contiguous sealing surface with the protrusion 520. Cutaway regions 541 and 543 are formed in the gasket body which are bounded above by shoulders 524 and 526.

The base portion 514 includes symmetric first and second lips 523 and 525, defined from above by the cutaway regions 514 and 543, respectively, and below by axially extending recesses 545 and 547, respectively. The recesses 541, 543, 545, and 547 cooperate with other features of the gasket body 510 to provide a hydraulic sealing function to provide increased sealing pressure when hydraulic pressure is applied one or the other sides of the gasket I.

Extending axially through the base 514 is an optional aperture 538, which is bisected by the axial centerline 512. In this embodiment, the aperture 538 is illustrated as being generally D-shaped or semielliptical in cross-sectional shape, although semicircular, and other geometrical cross-sectional shapes are also contemplated.

In FIG. 9, a gasket J in accordance with a seventh embodiment of the present invention is illustrated. The gasket J comprises a gasket body 610 having an axial centerline 612 bisecting the gasket profile.

The gasket body includes a base portion 614 and an oppositely disposed upper portion 616 having two protrusions 618 and 620. These are symmetrically disposed about the centerline 612 and run longitudinally along the length of the gasket body 610. A recess 622 is defined therebetween. Each of the protrusions 618 and 620 has a plurality of pressure ribs 619 formed on the sealing surface thereof. The upper portion 616 also comprises a pair of transversely extending first and second lips 624 and 626 symmetrically located about the centerline 612.

Extending axially through the upper portion 616 is an aperture or bore 630. The aperture 630 comprises a central region 632 bridging first and second transversely spaced apart lobes 634 and 636. The axial channel 630 is symmetrical about the axial centerline 612. The lobes 634 and 636 extend toward the spaced apart protrusions 618 and 620, respectively.

Extending axially through the base 614 is an optional aperture 638, which is bisected by the axial centerline 612. In this embodiment, the aperture is illustrated to be circular in cross-sectional shape, although elliptical and other geometrical cross-sectional shapes are also contemplated.

Referring now to FIG. 10, there is shown a gasket K in accordance with a eighth embodiment of the present invention which is similar to the gasket J shown in FIG. 9.

A gasket body 710 includes a base portion 714 and an oppositely disposed upper portion 716 having two protrusions 718 and 720, symmetrically disposed about a centerline 712. The protrusions run longitudinally along the length of the gasket body 710 and define a recess 722 therebetween. Each of the protrusions 718 and 720 has a plurality of pressure ribs 719 formed on the sealing surface thereof. The upper portion 716 also comprises a pair of transversely extending first and second lips 724 and 726 symmetrically located about the centerline 712.

Extending axially through the upper portion 716 is an aperture or bore 730 comprising a transversely symmetrical central region 732 bridging first and second spaced apart lobes 734 and 736. The lobes 734 and 736 extend toward the spaced apart protrusions 718 and 720, respectively.

Extending axially through the base 714 is an optional aperture 738, which is bisected by the axial centerline 712. In this embodiment, the aperture is illustrated to be circular in cross-sectional shape, although elliptical and other geometrical cross-sectional shapes are also contemplated. The base region 714 further comprises transversely extending lips 713 and 715.

Referring now to FIGS. 11 and 12, there are shown gaskets L and M, respectively, in accordance with ninth and tenth embodiments of the present invention. Each gasket body 810 (FIG. 11) or 910 (FIG. 12) includes a base portion 814 (FIG. 11) or 914 (FIG. 12) and an oppositely disposed upper portion 816 having two protrusions 818 and 820 symmetrically disposed about a centerline 812. The protrusions run longitudinally along the length of the gasket body, and define a recess 822 therebetween. Each of the protrusions 818 and 820 has a plurality of pressure ribs 819 formed on the sealing surface thereof. The upper portion 816 also comprises a pair of transversely extending first and second shoulders 824 and 826 which are symmetrically located about the centerline 812.

Extending axially through the upper portion 816 is an aperture or bore 830 comprising a transversely symmetrical central region 832 bridging first and second spaced apart lobes 834 and 836. The lobes 834 and 836 extend toward the spaced apart protrusions 818 and 820, respectively.

Extending axially through the base 814 are optional apertures 838 (FIG. 11) and 938 (FIG. 12), each of which is bisected by the axial centerline 812. In this embodiment, the apertures 838 and 938 are illustrated as circular and triangular in cross-sectional shape, although other geometrical cross-sectional shapes are also contemplated.

In FIG. 13, a gasket N in accordance with a eleventh embodiment of the present invention is illustrated. The gasket comprises a gasket body 1010 having an axial centerline 1012 bisecting the gasket profile.

The gasket body includes a base portion 1014 and an oppositely disposed upper portion 1016 having two protrusions 1018 and 1020 symmetrically disposed about the centerline 1012. The protrusions run longitudinally along the length of the gasket body 1010, and define a recess 1022 therebetween. Each of the protrusions 1018 and 1020 has a plurality of pressure ribs 1019 formed on the sealing surface thereof. The upper portion 1016 also comprises a pair of transversely extending first and second shoulders 1024 and 1026 symmetrically located about the centerline 1012.

Extending axially through the upper portion 1016 is an aperture or bore 1030. The aperture 1030 comprises a central region 1032 bridging first and second transversely spaced apart lobes 1034 and 1036. The axial channel 1030 is symmetrical about the axial centerline 1012. The lobes 1034 and 1036 extend toward the spaced apart protrusions 1018 and 1020, respectively.

Extending axially through the base 1014 is an optional aperture 1038, which is bisected by the axial centerline 1012. In this embodiment, the aperture is illustrated to be triangular in cross-sectional shape, although circular, elliptical, and other geometrical cross-sectional shapes are also contemplated.

In FIG. 14, a gasket O in accordance with a twelfth embodiment of the present invention is illustrated. The gasket comprises a gasket body 1110 having an axial centerline 1112 bisecting the gasket profile.

The gasket body includes a base portion 1114 and an oppositely disposed upper portion 1116 having two protrusions 1118 and 1120 symmetrically disposed about the centerline 1112. The protrusions run longitudinally along the length of the gasket body 1110 and define a recess 1122 therebetween. Each of the protrusions 1118 and 1120 has a plurality of pressure ribs 1119 formed on the sealing surface thereof. The upper portion 1016 also comprises a pair of transversely extending first and second shoulders 1024 and 1026 symmetrically located about the centerline 1012.

Extending axially through the upper portion 1116 is an aperture or bore 1130. The aperture 1130 comprises a central region 1132 bridging first and second transversely spaced apart lobes 1134 and 1136. The axial channel 1130 is symmetrical about the axial centerline 1112. The lobes 1134 and 1136 extend toward the spaced apart protrusions 1118 and 1120, respectively.

Extending axially along the transverse sides of the base 1114 are optional grooves or recesses 1141 and 1143, which are symmetrically disposed about the axial centerline 1112. In this embodiment, the grooves are illustrated to be semicircular in cross-sectional shape, although semielliptical and other geometrical cross-sectional shapes are also contemplated.

The above gasket embodiments D–N have bases which are generally rounded and are intended to engage a similarly shaped rounded annular groove in a pipe, such as groove 64 in the pipe section C. The base portion 1114 of the gasket O shown in FIG. 14 is generally trapezoidal in cross-sectional shape. It has a generally flat bottom surface 1148 and is intended to engage an appropriately shaped groove in a pipe section, such as a groove which is generally trapezoidal or rectangular in cross-sectional shape. In the illustrated embodiment, no channel is provided in the base 1114.

In FIG. 15, a gasket P in accordance with a thirteenth embodiment of the present invention is illustrated. The gasket comprises a gasket body 1210 having an axial centerline 1212 bisecting the gasket profile.

The gasket body includes a base portion 1214 and an oppositely disposed upper portion 1216 having two protrusions 1218 and 1220 symmetrically disposed about the centerline 1212. The protrusions run longitudinally along the length of the gasket body 1210, defining a recess 1222 therebetween. Each of the protrusions 1218 and 1220 has a plurality of pressure ribs 1219 formed on the sealing surface thereof. The upper portion 1216 also comprises a pair of transversely extending first and second shoulders 1224 and 1226 symmetrically located about the centerline 1212.

Extending axially through the upper portion 1216 is an aperture or bore 1230. The aperture 1230 comprises a central region 1232 bridging first and second transversely spaced apart lobes 1234 and 1236. The axial channel 1230 is symmetrical about the axial centerline 1212. The lobes 1234 and 1236 extend toward the spaced apart protrusions 1218 and 1220, respectively.

Extending axially along the bottom surface 1248 of base portion 1214 is an optional groove or recess 1245, which is bisected by the axial centerline 1212. In this embodiment, the groove is illustrated to be semicircular in cross-sectional shape, although semielliptical and other geometrical cross-sectional shapes are also contemplated. Like the gasket O of FIG. 14, the base portion 1214 is generally trapezoidal in cross section and is intended for use in a groove of a generally trapezoidal or rectangular cross-section.

Figure 16:
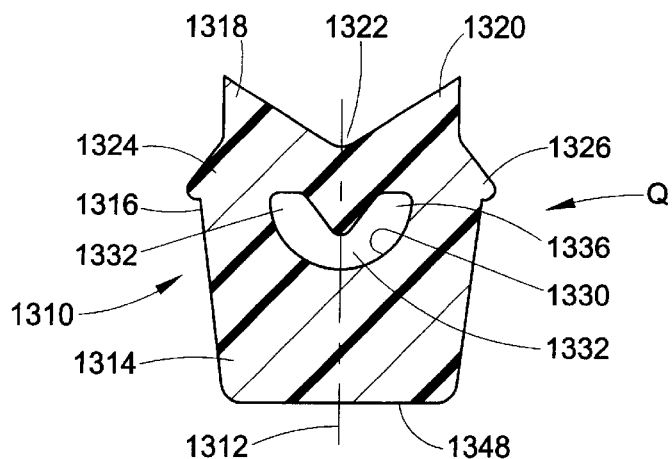

In FIG. 16, a gasket Q in accordance with a fourteenth embodiment of the present invention is illustrated. The gasket comprises a gasket body 1310 having an axial centerline 1312 bisecting the gasket profile.

The gasket body includes a base portion 1314 and an oppositely disposed upper portion 1316 having two protrusions 1318 and 1320 symmetrically disposed about the centerline 1312. The protrusions run longitudinally along the length of the gasket body 1310, defining a recess 1322 therebetween. The upper portion 1316 also comprises a pair of transversely extending first and second lips 1324 and 1326 symmetrically located about the centerline 1312.

Extending axially through the upper portion 1316 is an aperture or bore 1330. The aperture 1330 comprises a central region 1332 bridging first and second transversely spaced apart lobes 1334 and 1336. The axial channel 1330 is symmetrical about the axial centerline 1312. The lobes 1334 and 1336 extend toward the spaced apart protrusions 1318 and 1320, respectively.

The base portion 1314 is generally trapezoidal in cross section with a generally flat bottom 1348, and is intended for use in a groove of a generally trapezoidal or rectangular cross-section.

Figure 17:
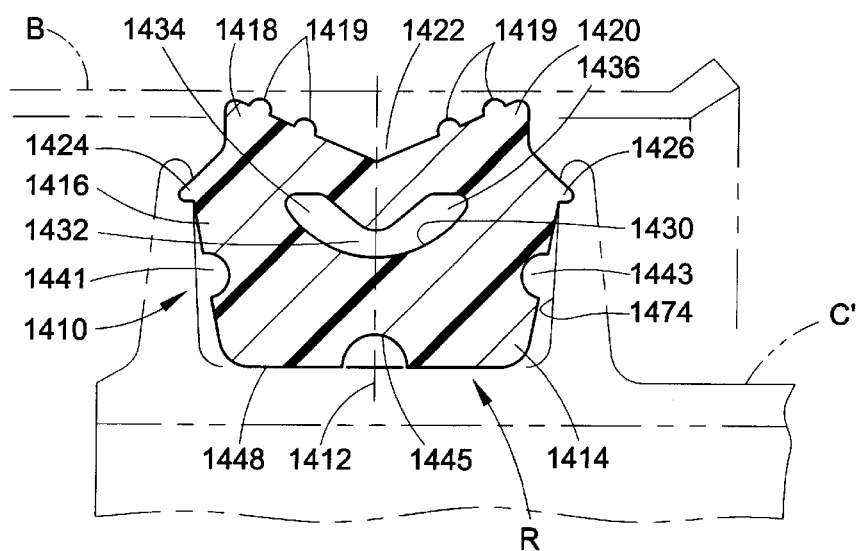
FIG. 17 is a cross-sectional view of a gasket in a pipe joint according to yet another embodiment of the present invention.

In FIG. 17, a gasket R in accordance with a fifteenth embodiment of the present invention is illustrated. The gasket comprises a gasket body 1410 having an axial centerline 1412 bisecting the gasket profile.

The gasket body includes a base portion 1414 and an oppositely disposed upper portion 1416 having two protrusions 1418 and 1420 symmetrically disposed about the centerline 1412. The protrusions run longitudinally along the length of the gasket body 1410, defining a recess 1422 therebetween. Each of the protrusions 1418 and 1420 has a plurality of pressure ribs 1419 formed on the sealing surface thereof. The upper portion 1416 also comprises a pair of transversely extending first and second lips 1424 and 1426 symmetrically located about the centerline 1412.

Extending axially through the upper portion 1416 is an aperture or bore 1430. The aperture 1430 comprises a central region 1432 bridging first and second transversely spaced apart lobes 1434 and 1436. The axial channel 1430 is symmetrical about the axial centerline 1412. The lobes 1434 and 1436 extend toward the spaced apart protrusions 1418 and 1420, respectively.

Extending axially along the transverse sides of the base 1414 are optional grooves or recesses 1441 and 1443, which are symmetrically disposed about the axial centerline 1112. Extending axially along the bottom surface 1448 of base portion 1414 is an optional groove or recess 1445, which is bisected by the axial centerline 1412. In this embodiment, the grooves are illustrated to be semicircular in cross-sectional shape, although semielliptical and other geometrical cross-sectional shapes are also contemplated.

The base portion 1414 is generally trapezoidal in cross section, and is shown seated in a groove 1474 having a generally trapezoidal or rectangular cross-section of a second pipe section C', shown in phantom lines. The gasket R is shown in its uncompressed state, with the placement of a mating first pipe B also being shown in phantom lines.

Although not identical, the aforementioned gaskets D–M, and O illustrate a first general preferred configuration of the axially extending channels having laterally spaced apart lobes, having a cross-sectional shape that somewhat resembles a telephone handset. Likewise, the embodiments P–R illustrate a second general preferred configuration of said axially extending channel which is generally sickle- or crescent-shaped in cross section. The embodiment N illustrates a third generally preferred configuration thereof, which can be described as being somewhat canoe-shaped in cross section.

Figure 18:
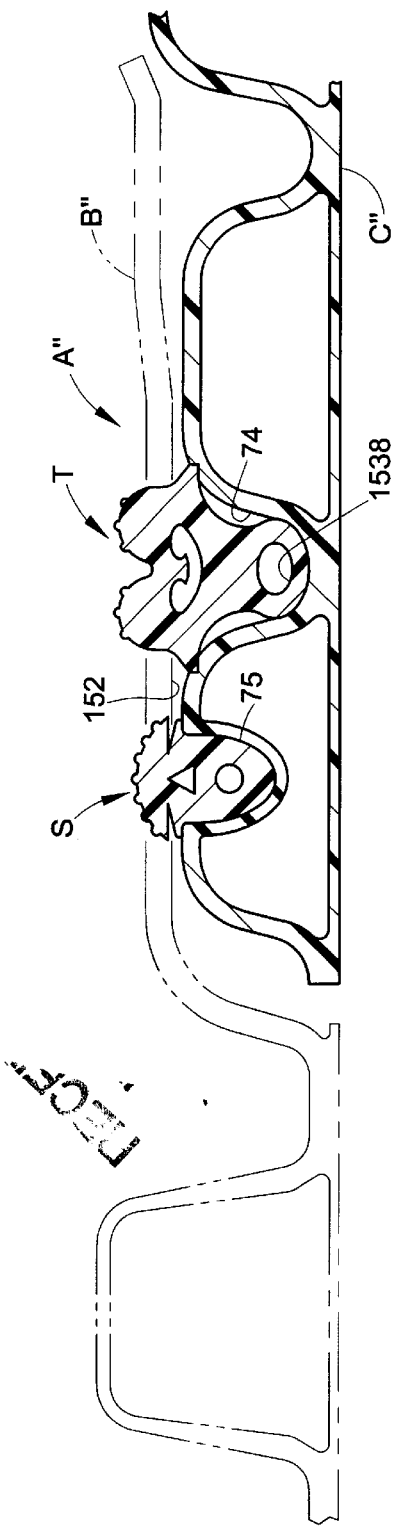
FIG. 18 is a cross-sectional view of a gasket according to still another embodiment of the present invention in a pipe joint utilizing a supplemental gasket.

With reference now to FIG. 18, another type of pipe joint is illustrated which employs a main gasket T, in accordance with a further embodiment of the present invention. The gasket T is a variation of the gasket J, shown and described above by way of reference to FIG. 9, and which differs therefrom in that has a greater transverse width; also the gasket T and is shown with an optional base channel 1538 that is elliptical in cross section, whereas the corresponding channel 638 of the gasket J has a circular cross-section.

The gasket T is seated in a first annular groove 74 formed in a male or second pipe C'''. The pipe joint further comprises a supplemental gasket S seated in a second annular groove 75. The supplemental gasket S is advantageously a symmetrical gasket of a type shown an described in the aforementioned U.S. Pat. No. 5,687,976. The gaskets L and S are shown in their uncompressed state, with the relative placement of a first pipe B" shown in phantom lines. In assembly of the pipe joint, the gaskets L and S are compressed to provide a sealing interference between their respective grooves and an inner surface 152 of the pipe section B".

Thus, there has been described new and improved gaskets for pipe joints, as well as pipe joints and methods employing the same. The gaskets of the present invention are particularly suited for mounting in storm or sanitary sewer pipes that have a bell-and-spigot type joint. The gaskets are insensitive to axial orientation and can be installed in either axial orientation in a pipe joint.

The gaskets of the present invention provide certain advantages over prior art gasket designs, such as increased surface contact area or footprint, or increased contact force or pressure.

The gaskets of the present invention may advantageously be employed to maintain a seal in non- or low-pressure environments, i.e., in compression, as well as in pressurized environments, i.e., under hydraulic induced internal or external pressures and internal vacuums. The subject gaskets may also be employed to facilitate a seal where a defect exists in the surface condition of the pipes to be joined. This reduces the failure rate of the pipe joints and the number of pipe segments disqualified due to such imperfections, thus decreasing costs.

The invention has been described with reference to several preferred embodiments. Obviously, modifications and alterations will occur to others upon the reading and understanding of this specification. It is intended to include all such modifications and alterations insofar as they come within the scope of the appended claims or the equivalents thereof.

What is claimed is:

1. A pipe joint comprising:
    an outer pipe;
    an inner pipe inserted into said outer pipe, wherein one of said outer pipe and said inner pipe comprises an annular groove; and
    a gasket positioned within said annular groove and adapted to provide a seal between said outer pipe and said inner pipe, said gasket comprising:
        an annular gasket body formed of a resilient material, said gasket body having a centerline and including a base adapted to sealingly engage said groove;
        first and second projections running along the gasket body and extending away therefrom, and said first and second projections being located on opposed sides of the centerline; and
        an annular bore extending in said gasket body, said bore comprising a central region bridging first and second spaced apart lobes, said bore central region having a height dimension less than a height dimension of at least one of said first and said second spaced apart lobes, said bore being located in said gasket body such that it is bisected by said centerline thereof.

2. The pipe joint of claim 1, wherein said gasket further comprises:
    a first recess formed in said gasket body adjacent said first projection, said first recess being located on a first side of said centerline; and
    a second recess formed in said gasket body adjacent said second projection, said second recess being located on a second side of said centerline.

3. The pipe joint of claim 1, wherein said gasket further comprises:
    a first lip located on an outer periphery of said gasket body and positioned on a first side of said centerline; and
    a second lip located on said outer periphery of said gasket body and positioned on a second side of said centerline.

4. A pipe joint comprising:
    an outer pipe;
    an inner pipe inserted into said outer pipe, wherein one of said outer pipe and said inner pipe comprises an annular groove; and
    a gasket positioned within said annular groove and adapted to provide a seal between said outer pipe and said inner pipe, said gasket comprising:
        an annular gasket body formed of a resilient material, said gasket body having a centerline and including a base adapted to sealingly engage said groove;
        first and second projections running along the gasket body and extending away therefrom, and said first and second projections being located on opposed sides of the centerline;
        a first annular bore extending in said gasket body, said first bore comprising a central region bridging first and second spaced apart lobes and at least one annular projection extending into said first bore from said central region, said first bore being located in said gasket body such that it is bisected by said centerline thereof; and
        a second annular bore extending in said gasket body, said second bore being spaced from said first bore and from said projections.

5. The pipe joint of claim 4, wherein said second bore is located within said gasket body such that it is bisected by said centerline thereof.

6. A pipe joint comprising:
    an outer pipe;
    an inner pipe inserted into said outer pipe, wherein one of said outer pipe and said inner pipe comprises an annular groove; and
    a gasket positioned within said annular groove and adapted to provide a seal between said outer pipe and said inner pipe, said gasket comprising:
        an annular gasket body formed of a resilient material, said gasket body having a centerline and including a base adapted to sealingly engage said groove;
        first and second projections running along the gasket body and extending away therefrom, and said first and second projections being located on opposed sides of the centerline;
        an annular bore extending in said gasket body, said bore comprising a central region bridging first and second spaced apart lobes and an annular projection extending into said bore from said central region, said bore being located in said gasket body such that it is bisected by said centerline thereof; and,
        a recess formed on a surface of the gasket body.

7. The pipe joint of claim 6, wherein said recess is located on a surface of the base of the gasket.

8. The pipe joint of claim 7, wherein the recess is disposed on a surface opposite said first and second protrusions, and wherein the recess is bisected by said centerline.

9. A pipe joint comprising:
    an outer pipe;
    an inner pipe inserted into said outer pipe, wherein one of said outer pipe and said inner pipe comprises an annular groove;

a first gasket positioned within said annular groove and adapted to provide a seal between said outer pipe and said inner pipe, said first gasket comprising:
an annular gasket body formed of a resilient material, said gasket body having a centerline and including a base adapted to sealingly engage said groove;
first and second projections running along the gasket body and extending radially therefrom, and said first and second projections symmetrically spaced apart about the centerline; and
an annular bore extending in said gasket body, said bore comprising a central region bridging first and second spaced apart lobes, said bore central region having a height dimension less than a height dimension of at least one of said first and said second spaced apart lobes, said bore being located in said gasket body such that it is bisected by said centerline thereof; and
a second gasket positioned within a second annular groove formed in one of said inner and outer pipes, the second gasket adapted to provide a second seal between said outer pipe and said inner pipe.

10. The pipe joint of claim 9, wherein the first and second gaskets occupy adjacent axial positions along the pipe joint.

11. The pipe joint of claim 10, wherein the first gasket is in fluid communication with an exterior of the inner and outer pipes, and wherein the second gasket is in fluid communication with an interior of the inner and outer pipes.

12. A non-directional gasket which is insensitive to axial gasket orientation, comprising:
an annular gasket body formed of a resilient material, said gasket body having an axial centerline and a base adapted to sealingly engage an annular groove on a pipe;
first and second projections running along the gasket body and extending radially therefrom, and said first and second projections being symmetrically spaced apart about the centerline; and
an annular bore extending in said gasket body, said bore comprising a central region bridging first and second transversely spaced apart lobes and an annular projection extending into said annular bore from said central region, said bore being located in said gasket body such that it is bisected by said centerline thereof.

13. The gasket of claim 12, further comprising:
a first recess formed in said gasket body adjacent said first projection, said first recess being located on a first side of said centerline; and
a second recess formed in said gasket body adjacent said second projection, said second recess being located on a second side of said centerline.

14. The gasket of claim 12, further comprising:
a first lip located on an outer periphery of said gasket body and positioned on a first side of said centerline; and
a second lip located on said outer periphery of said gasket body and positioned on a second side of said centerline.

15. The gasket of claim 12, further comprising:
a pair of sealing lips located on opposite sides of said base.

16. The gasket of claim 12, wherein said first and second lobes are aligned with and extend toward the first and second projections, respectively.

17. The gasket of claim 12, further comprising:
one or more pressure ribs protruding from said first and second projections.

18. A gasket for sealing an annular space in a bell-and-spigot pipe joint, comprising:
an annular elastomeric web having an inner peripheral surface formed to sealingly engage an outer periphery of an associated spigot, said web having a centerline;
first and second elastomeric protrusions projecting away from said web, said protrusions being spaced apart and disposed on opposite sides of the centerline, said protrusions being deflectable to engage an inner periphery of an associated bell;
a central recess defined between said first and second protrusions, said central recess being bisected by said centerline; and,
a closed-wall annular bore extending in said elastomeric web, said bore being spaced from said protrusions and being so located on said elastomeric web that it is bisected by said centerline thereof, said annular bore comprises a central region bridging first and second transversely spaced apart lobes and an annular projection extending into said annular bore from adjacent said central region; and
wherein the gasket can be installed in an associated pipe joint in either direction along a longitudinal axis of the associated pipe joint.

19. The gasket of claim 18, wherein said first and second lobes are subjacent to said first and second protrusions, respectively.

20. The gasket of claim 18, wherein each of said protrusions comprises a sealing member having a cross-sectional shape selected from generally triangular, semicircular, and circular shapes.

21. The gasket of claim 18, wherein said elastomeric web further comprises first and second lips projecting radially outwardly and symmetrically located on opposing sides of said centerline.

22. The gasket of claim 18, wherein said web comprises at least one of:
a pair of additional recesses located on opposing sides of the web and symmetrically disposed about said centerline; and
an auxiliary recess formed in a sealing surface disposed opposite said protrusions and bisected by said centerline.

23. A pipe joint which can accommodate one or more defects in a sealing surface forming said pipe joint to form a functional seal, said pipe joint comprising:
an outer pipe;
an inner pipe inserted into said outer pipe, wherein one of said outer pipe and said inner pipe comprises an annular groove; and
a gasket positioned within said annular groove and adapted to provide a seal between said outer pipe and said inner pipe, said gasket comprising:
an annular gasket body formed of a resilient material, said gasket body having a centerline and including a base adapted to sealingly engage said groove;
first and second projections running along the gasket body and extending away therefrom, and said first and second projections being symmetrically spaced apart about the centerline and defining a recess therebetween, said gasket body being deformable to increase a surface contact area when the inner pipe is inserted into the outer pipe; and
an annular bore extending in said gasket body, said bore adapted to equalize pressure transversely across the surface contact area when the inner pipe is inserted into the outer pipe, said annular bore including an annular projection bisected by said gasket centerline and extending partially across said annular bore.

24. The pipe joint of claim 23, wherein the annular bore comprises:
- a central region bridging first and second transversely spaced apart lobes, said bore being located in said gasket body such that it is bisected by said centerline thereof.

25. A non-directional gasket that is insensitive to axial gasket orientation for compressive installation between an inner pipe and an outer pipe, said gasket comprising:
- a gasket body having an axial centerline;
- a first and a second exterior annular projections extending outwardly from said gasket body;
- an annular bore in said gasket body that is substantially bisected by said centerline; and
- an interior annular projection extending from said gasket body into said annular bore.

26. A non-directional gasket according to claim 25, wherein said annular bore includes a first lobe located on one side of said centerline.

27. A non-directional gasket according to claim 26, wherein said annular bore includes a second lobe located on another side of said centerline.

28. A non-directional gasket that is insensitive to axial gasket orientation for compressive installation between an inner pipe and an outer pipe, said gasket comprising:
- a gasket body having an axial centerline;
- a first and a second exterior annular projections extending outwardly from said gasket body;
- an annular bore in said gasket body that is substantially bisected by said centerline, said annular bore including a central region and a pair of lobes spaced from one another on opposing sides of said central region, said central region having a height and each of said lobes of said pair of lobes having a respective height, said height of at least one of said lobes being greater than said height of said central region.

* * * * *